(12) United States Patent
Briliauskas et al.

(10) Patent No.: US 11,775,642 B1
(45) Date of Patent: *Oct. 3, 2023

(54) MALWARE DETECTION USING FEDERATED LEARNING

(71) Applicant: UAB 360 IT, Vilnius (LT)

(72) Inventors: Mantas Briliauskas, Vilnius (LT); Dainius Razinskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,318

(22) Filed: Jun. 17, 2022

Related U.S. Application Data

(63) Continuation of application No. 17/843,062, filed on Jun. 17, 2022, now Pat. No. 11,593,485.

(51) Int. Cl.
*G06F 21/56* (2013.01)
*G06N 20/00* (2019.01)

(52) U.S. Cl.
CPC .......... *G06F 21/566* (2013.01); *G06F 21/565* (2013.01); *G06N 20/00* (2019.01); *G06F 2221/034* (2013.01)

(58) Field of Classification Search
CPC ...... G06F 21/56; G06F 21/566; G06F 21/565; G06F 2221/034; G06F 2221/32; G06N 20/20

See application file for complete search history.

(56) References Cited

U.S. PATENT DOCUMENTS

| | | | |
|---|---|---|---|
| 11,399,041 B1* | 7/2022 | Kannan | H04L 63/1433 |
| 2019/0108338 A1* | 4/2019 | Saxe | G06N 20/00 |
| 2019/0164164 A1* | 5/2019 | Karambakkam | G06F 3/0486 |
| 2020/0285980 A1* | 9/2020 | Sharad | G06N 5/043 |
| 2022/0114260 A1* | 4/2022 | Udupi Raghavendra | H04L 63/145 |
| 2023/0026385 A1* | 1/2023 | Zhang | G06N 20/00 |
| 2023/0041015 A1* | 2/2023 | Chhibber | H04L 63/08 |

FOREIGN PATENT DOCUMENTS

| | | | | |
|---|---|---|---|---|
| CN | 110059726 A | 7/2019 | | |
| CN | 113051557 A | 6/2021 | | |
| WO | 2021159753 A1 | 8/2021 | | |
| WO | WO-2021159753 A1 * | 8/2021 | | G06F 30/27 |
| WO | 2022052476 A1 | 3/2022 | | |
| WO | WO-2022052476 A1 * | 3/2022 | | |

* cited by examiner

*Primary Examiner* — Jayesh M Jhaveri

(74) *Attorney, Agent, or Firm* — Meunier Carlin & Curfman LLC

(57) ABSTRACT

A malware detection method that uses federated learning includes transmitting file characterization information for one or more local files, receiving a first malware detection model and labeled training data that is generated by a remote device, training the first malware detection model using the labeled training data set, transmitting parameters of the trained first malware detection model to the remote device, and receiving, from the remote device, a second malware detection model, wherein the second malware detection model is trained by federated learning using the parameters of the trained first malware detection model and additional parameters provided by one or more additional remote devices.

20 Claims, 5 Drawing Sheets

MALWARE DETECTION USING FEDERATED LEARNING

CROSS-REFERENCE TO RELATED APPLICATIONS

This application is a continuation of U.S. patent application Ser. No. 17/843,062, filed Jun. 17, 2022, which is incorporated herein by reference in its entirety.

BACKGROUND

The present disclosure relates generally to cyber security and more specifically to malware detection using predictive models.

With the growing interconnectedness of computing devices and systems, in an increasingly digital age, new cyber security threats (e.g., malware) are constantly being identified. To address ever-changing threats, some cyber security service providers (CSSPs) utilize machine learning in their malware detection and/or protection products (e.g., software) to identify and/or predict malicious software, files, etc. Thus, it may be beneficial to collect files for training machine learning models from both external malware databases and from actual client (i.e., user) devices. However, certain files stored on client devices, such as documents (e.g., file types .pdf, .doc, .txt, etc.), images (e.g., files types .png, .tiff, .jpg, etc.), and the like, may contain sensitive information (e.g., personal identifying information (PII), passwords, trade secrets, internal data, etc.). Accordingly, CSSPs do not incorporate these types of files into the training of machine learning models for malware detection, instead only including files such as portable executables (e.g., file types .exe, .sys, .ocx, etc.) that do not include sensitive information. However, limiting the number and/or types of files used to train a machine learning model for malware detection can result in a less effective model and, thereby, less accurate malware detection (e.g., a malware detection model that is not tailored to the individual needs of various users and is trained on a limited amount of data). Additionally, traditional methods of training machine learning models often require a large amount of computing resources on a CSSP's infrastructure.

SUMMARY

One implementation of the present disclosure is a method of generating a predictive model for malware detection using federated learning. The method includes transmitting, to each of a plurality of remote devices, a copy of the predictive model, where the predictive model is configured to predict whether a file is malicious; receiving, from each of the plurality of remote devices, model parameters determined by independently training the copy of the predictive model on each of the plurality of remote devices using local files stored on respective ones of the plurality of remote devices; generating a federated model by training the predictive model based on the model parameters received from each of the plurality of remote devices; and transmitting the federated model to each of the plurality of remote devices.

In some embodiments, the method further includes transmitting, to the plurality of remote devices and concurrently with transmitting the copy of the predictive model, the malware properties database, where each of the plurality of remote devices uses the malware properties database to detect malicious files prior to independently training the copy of predictive model.

In some embodiments, the method further includes receiving, from each of the plurality of remote devices and concurrently with receiving the model parameters, metadata indicating a version of the copy of the predictive model trained on the corresponding one of the plurality of remote devices.

In some embodiments, the method further includes comparing the version of each of copies of the predictive models trained by the plurality of remote devices with a current version of the predictive model to determine whether the copy of the predictive model trained by any of the plurality of remote devices is out of date.

In some embodiments, the method further includes comparing a feature set of the at least one out-of-date model with a feature set of the current version of the predictive model responsive to identifying at least one out-of-date model from the copies of the predictive model trained by the plurality of remote devices, where the set of weights associated with the at least one out-of-date model are not used to generate the plurality of trained predictive models if the feature set of the at least one out-of-date model does not match the feature set of the current version of the predictive model.

In some embodiments, the method further includes receiving, from each of the plurality of remote devices, features extracted from one or more local files that are predicted to be malicious, where the features are extracted by each of the plurality of remote devices using either: i) the copy of the predictive model, or ii) the federated model; and updating the malware properties database based on the received features.

In some embodiments, the model parameters include model weights.

In some embodiments, the malware properties database includes file characterization information for a plurality of known malicious files.

In some embodiments, generating the federated model further includes generating multiple instances of the federated model based on the model parameters received from each of the plurality of remote devices; and testing each instance of the multiple instances of the federated model to identify a best-performing instance of the federated model, where the best-performing instance of the federated model is the transmitted to each of the plurality of remote devices.

In some embodiments, the federated learning model is generated by training the predictive model using one or more federated learning techniques, including at least one of federated stochastic gradient descent, federated averaging, or dynamic regularization.

Another implementation of the present disclosure is a malware detection system having one or more processors and memory having instructions stored thereon that, when executed by the one or more processors, cause the one or more processors to perform operations including generating an initial instantiation of a model for predicting whether a file is malicious; transmitting, to a plurality of remote devices, the initial instantiation of the model and a malware properties database, where the malware properties database includes a set of hashes of known malicious files; receiving, from each of the plurality of remote devices, parameters for the model, where the parameters are determined by independently training the initial instantiation of the model on each of the plurality of remote devices using the malware properties database and local files stored on respective ones of the plurality of remote devices; generating a federated model by training the model using on the parameters received from each of the plurality of remote devices; and transmitting the federated model to each of the plurality of remote devices.

In some embodiments, each of the plurality of remote devices uses the malware properties database to detect malicious files prior to independently training the initial instantiation of the model.

In some embodiments, the operations further include receiving, from each of the plurality of remote devices and concurrently with receiving the one or more weights, metadata indicating a version of the model trained on the corresponding one of the plurality of remote devices.

In some embodiments, the operations further include comparing the version of the model trained by each of the plurality of remote devices with a current version of the model to determine whether the model trained by any of the plurality of remote devices is out of date.

In some embodiments, the operations further include comparing a feature set of the at least one out-of-date model with a feature set of the current version of the predictive model responsive to identifying at least one out-of-date model from the models trained by each of the plurality of remote devices, where the one or more weights associated with the at least one out-of-date model are not used to generate the plurality of trained models if the feature set of the at least one out-of-date model does not match the feature set of the current version of the model.

In some embodiments, the operations further include receiving, from each of the plurality of remote devices, features extracted from one or more local files that are predicted to be malicious, where the features are extracted by each of the plurality of remote devices using either: i) the copy of the predictive model, or ii) the federated model; and updating the malware properties database based on the received features.

In some embodiments, the parameters include model weights.

In some embodiments, the malware properties database includes file characterization information for a plurality of known malicious files.

In some embodiments, the operations further include generating the federated model further includes generating multiple instances of the federated model based on the parameters received from each of the plurality of remote devices; and testing each instance of the multiple instances of the federated model to identify a best-performing instance of the federated model, where the best-performing instance of the federated model is the transmitted to each of the plurality of remote devices.

In some embodiments, the federated learning model is generated by training the model using one or more federated learning techniques, including at least one of federated stochastic gradient descent, federated averaging, or dynamic regularization.

Yet another implementation of the present disclosure is a malware detection method that uses federated learning. The method includes receiving, from a remote device, a first malware detection model and a database of known malicious files; labeling each file of a training data set as either malicious or clean by comparing each file of the training data set to the database, where: if a file matches a known malicious file in the database, the file is labeled as malicious; and if a match is not identified for a file of the training data set, the file is evaluated using the first malware detection model to predict whether the file is malicious and the file is labeled based on the prediction; training the first malware detection model using the labeled training data set;

transmitting parameters of the trained first malware detection model to the remote device; and receiving, from the remote device, a second malware detection model, where the second malware detection model is trained by federated learning using the parameters of the trained first malware detection model and additional parameters provided by one or more additional remote devices.

In some embodiments, the database includes file characterization information for a plurality of known malicious files.

In some embodiments, the training data set includes a hash for each of a plurality of local files, where the training data set does not include sensitive information contained in any of the plurality of local files.

In some embodiments, predicting whether the file is malicious includes generating, by the first malware detection model, a maliciousness score for the file, where the is labeled as malicious if the maliciousness score meets or exceeds a threshold.

In some embodiments, the second malware detection model is trained using one or more federated learning techniques including at least one of federated stochastic gradient descent, federated averaging, or dynamic regularization.

In some embodiments, the parameters of the trained first malware detection model include model weights.

In some embodiments, the method further includes deleting the labeled training data set from local storage once the first malware detection model is trained.

In some embodiments, the first malware detection model is a supervised learning model.

In some embodiments, responsive to predicting that a file is malicious using the first malware detection model, extracting features of the file, where the extracted features do not include any sensitive information related to the file; and transmitting, to the remote device and concurrently with transmitting the parameters of the trained first malware detection model, the extracted features.

In some embodiments, the method further includes transmitting, to the remote device and concurrently with transmitting the parameters of the trained first malware detection model, metadata associated with the first malware detection model, where the metadata indicates a least a version number of the first malware detection model.

Yet another implementation of the present disclosure is a malware detection system that includes one or more processors and memory having instructions stored thereon that, when executed by the one or more processors, cause the one or more processors to perform operations including receiving, from a remote device, a first malware detection model and a database of known malicious files; labeling each file of a training data set as either malicious or clean by comparing each file of the training data set to the database, where: if a file matches a known malicious file in the database, the file is labeled as malicious; and if a match is not identified for a file of the training data set, the file is evaluated using the first malware detection model to predict whether the file is malicious and the file is labeled based on the prediction; training the first malware detection model using the labeled training data set; transmitting parameters of the trained first malware detection model to the remote device; and receiving, from the remote device, a second malware detection model, where the second malware detection model is trained by federated learning using the parameters of the trained first malware detection model and additional parameters provided by one or more additional remote devices.

In some embodiments, the database includes a hash of each of the known malicious files.

In some embodiments, the training data set includes a hash for each of a plurality of local files, where the training data set does not include sensitive information contained in any of the plurality of local files.

In some embodiments, predicting whether the file is malicious includes generating, by the first malware detection model, a maliciousness score for the file, where the is labeled as malicious if the maliciousness score meets or exceeds a threshold.

In some embodiments, the second malware detection model is trained using one or more federated learning techniques including at least one of federated stochastic gradient descent, federated averaging, or dynamic regularization.

In some embodiments, the parameters of the trained first malware detection model include model weights.

In some embodiments, the operations further include deleting the labeled training data set from local storage once the first malware detection model is trained.

In some embodiments, the first malware detection model is a supervised learning model.

In some embodiments, the operations further include responsive to predicting that a file is malicious using the first malware detection model, extracting features of the file, where the extracted features do not include any sensitive information related to the file; and transmitting, to the remote device and concurrently with transmitting the parameters of the trained first malware detection model, the extracted features.

In some embodiments, the operations further include transmitting, to the remote device and concurrently with transmitting the parameters of the trained first malware detection model, metadata associated with the first malware detection model, where the metadata indicates a least a version number of the first malware detection model.

Yet another implementation of the present disclosure is a malware detection method that uses federated learning. The method includes transmitting, to a remote device, file characterization information for one or more local files, where the remote device generates labeled training data by i) comparing the file characterization information of each of the one or more local files to a malware properties database, and ii) labeling each of the one or more files as either malicious or clean based on the comparison; receiving, from the remote device, a first malware detection model and the labeled training data; training the first malware detection model using the labeled training data set; transmitting parameters of the trained first malware detection model to the remote device; and receiving, from the remote device, a second malware detection model, where the second malware detection model is trained by federated learning using the parameters of the trained first malware detection model and additional parameters provided by one or more additional remote devices.

In some embodiments, the malware properties database includes file characterization information for a plurality of known malicious files.

In some embodiments, the remote device labels a file as malicious if a match is identified between the file characterization information of the file and the file characterization information of one of the plurality of known malicious files.

In some embodiments, the remote device is configured to predict a maliciousness of at least one file of the one or more local files using the first malware detection model if a match is not identified, where the at least one file is labeled as either malicious or clean based on the prediction.

In some embodiments, the file characterization information for the one or more local files does not include sensitive information contained in any of the one or more local files.

In some embodiments, the second malware detection model is trained using one or more federated learning techniques including at least one of federated stochastic gradient descent, federated averaging, or dynamic regularization.

In some embodiments, the parameters of the trained first malware detection model include model weights.

In some embodiments, the first malware detection model is a supervised learning model.

In some embodiments, the method further includes predicting a maliciousness of at least one additional local file using the second malware detection model.

In some embodiments, the method further includes transmitting, to the remote device and concurrently with transmitting the parameters of the trained first malware detection model, metadata associated with the first malware detection model, where the metadata indicates a least a version number of the first malware detection model.

Yet another implementation of the present disclosure is a malware detection system that includes one or more processors and memory having instructions stored thereon that, when executed by the one or more processors, cause the one or more processors to perform operations including transmitting, to a remote device, file characterization information for one or more local files, where the remote device generates labeled training data by i) comparing the file characterization information of each of the one or more local files to a malware properties database, and ii) labeling each of the one or more files as either malicious or clean based on the comparison; receiving, from the remote device, a first malware detection model and the labeled training data; training the first malware detection model using the labeled training data set; transmitting parameters of the trained first malware detection model to the remote device; and receiving, from the remote device, a second malware detection model, where the second malware detection model is trained by federated learning using the parameters of the trained first malware detection model and additional parameters provided by one or more additional remote devices.

In some embodiments, the malware properties database includes file characterization information for a plurality of known malicious files.

In some embodiments, the remote device labels a file as malicious if a match is identified between the file characterization information of the file and the file characterization information of one of the plurality of known malicious files.

In some embodiments, the remote device is configured to predict a maliciousness of at least one file of the one or more local files using the first malware detection model if a match is not identified, where the at least one file is labeled as either malicious or clean based on the prediction.

In some embodiments, the file characterization information for the one or more local files does not include sensitive information contained in any of the one or more local files.

In some embodiments, the second malware detection model is trained using one or more federated learning techniques including at least one of federated stochastic gradient descent, federated averaging, or dynamic regularization.

In some embodiments, the parameters of the trained first malware detection model include model weights.

In some embodiments, the first malware detection model is a supervised learning model.

In some embodiments, the operations further include predicting a maliciousness of at least one additional local file using the second malware detection model.

In some embodiments, the operations further include transmitting, to the remote device and concurrently with transmitting the parameters of the trained first malware detection model, metadata associated with the first malware detection model, where the metadata indicates a least a version number of the first malware detection model.

Yet another implementation of the present disclosure is a system for detecting malware. The system includes a server and a non-transitory computer readable medium having instructions stored thereon that, when executed by one or more processors, cause the one or more processors to perform operations including receiving, from a remote device, a first malware detection model and a database of known malicious files; labeling each file of a training data set as either malicious or clean by comparing each file of the training data set to the database, where:

if a file matches a known malicious file in the database, the file is labeled as malicious; and if a match is not identified for a file of the training data set, the file is evaluated using the first malware detection model to predict whether the file is malicious and the file is labeled based on the prediction; training the first malware detection model using the labeled training data set; transmitting parameters of the trained first malware detection model to the server; and receiving, from the server, a second malware detection model, where the second malware detection model is trained by federated learning using the parameters of the trained first malware detection model and additional parameters provided by one or more remote devices.

In some embodiments, the database includes a hash of each of the known malicious files.

In some embodiments, the training data set includes a hash for each of a plurality of local files, where the training data set does not include sensitive information contained in any of the plurality of local files.

In some embodiments, predicting whether the file is malicious includes generating, by the first malware detection model, a maliciousness score for the file, where the is labeled as malicious if the maliciousness score meets or exceeds a threshold.

In some embodiments, the second malware detection model is trained using one or more federated learning techniques including at least one of federated stochastic gradient descent, federated averaging, or dynamic regularization.

In some embodiments, the parameters of the trained first malware detection model include model weights.

In some embodiments, the operations further include deleting the labeled training data set from local storage once the first malware detection model is trained.

In some embodiments, the first malware detection model is a supervised learning model.

In some embodiments, the operations further include, responsive to predicting that a file is malicious using the first malware detection model, extracting features of the file, where the extracted features do not include any sensitive information related to the file; and transmitting, to the server and concurrently with transmitting the parameters of the trained first malware detection model, the extracted features.

In some embodiments, the operations further include transmitting, to the server and concurrently with transmitting the parameters of the trained first malware detection model, metadata associated with the first malware detection model, where the metadata indicates a least a version number of the first malware detection model.

Yet another implementation of the present disclosure is a system including a server and non-transitory computer readable medium having instructions stored thereon that, when executed by one or more processors, cause the one or more processors to perform operations including receiving, from a server, a first malware detection model and a database of known malicious files; labeling each file of a training data set as either malicious or clean by comparing each file of the training data set to the database, where: if a file matches a known malicious file in the database, the file is labeled as malicious; and if a match is not identified for a file of the training data set, the file is evaluated using the first malware detection model to predict whether the file is malicious and the file is labeled based on the prediction; training the first malware detection model using the labeled training data set; transmitting parameters of the trained first malware detection model to the server; and receiving, from the server, a second malware detection model, where the second malware detection model is trained by federated learning using the parameters of the trained first malware detection model and additional parameters provided by one or more remote devices.

In some embodiments, the database includes a hash of each of the known malicious files.

In some embodiments, the training data set includes a hash for each of a plurality of local files, where the training data set does not include sensitive information contained in any of the plurality of local files.

In some embodiments, predicting whether the file is malicious includes generating, by the first malware detection model, a maliciousness score for the file, where the is labeled as malicious if the maliciousness score meets or exceeds a threshold.

In some embodiments, the second malware detection model is trained using one or more federated learning techniques including at least one of federated stochastic gradient descent, federated averaging, or dynamic regularization.

In some embodiments, the parameters of the trained first malware detection model include model weights.

In some embodiments, the operations further include deleting the labeled training data set from local storage once the first malware detection model is trained.

In some embodiments, the first malware detection model is a supervised learning model.

In some embodiments, the operations further include responsive to predicting that a file is malicious using the first malware detection model, extracting features of the file, where the extracted features do not include any sensitive information related to the file; and transmitting, to the server and concurrently with transmitting the parameters of the trained first malware detection model, the extracted features.

In some embodiments, the operations further include transmitting, to the server and concurrently with transmitting the parameters of the trained first malware detection model, metadata associated with the first malware detection model, where the metadata indicates a least a version number of the first malware detection model.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the figures, a malware detection system and methods for generating and training malware detection models are shown. In particular, the system and methods described herein utilize federated learning to address the limitations described above. Federated learning is a technique of training a model (e.g., a predictive model) using a decentralized architecture. For example, a malware detection model can be distributed to a plurality of client (i.e., remote) devices from a service provider computing system (e.g., a server) and can be trained on each of the client devices individually, using data that is local to the client devices (e.g., documents, images, programs, etc.). The results of training each instantiation of the model can then be merged, by the service provider computing system, to retrain the original malware detection model. Specifically, each client device may transmit parameters (e.g., weights) from their corresponding trained model to the service provider computing system, where the parameters are combined into a new model and/or used to retrain the original malware detection model.

It will be appreciated that the data used to train the malware detection models individually on the client devices remains on its respective client device. In other words, no sensitive information is transmitted from a client device to the service provider computing system. Instead, the service provider computing system receives model weights, model metadata, and the like, which do not include sensitive information. However, unlike other methods of training a malware detection model, the federate learning methods described herein leverage the unique files stored on each client device, which can result in a more robust and accurate model that reflects client preferences. Further, individually training the malware detection model on each of the client devices results in a lower computational workload for the service provider computing system, as the client devices handle the burden of training each instantiation of the model and require smaller data sets (e.g., local training data) for training. Additional features and advantages of the system and methods described herein are discussed in detail below.

Overview

Figure 1:
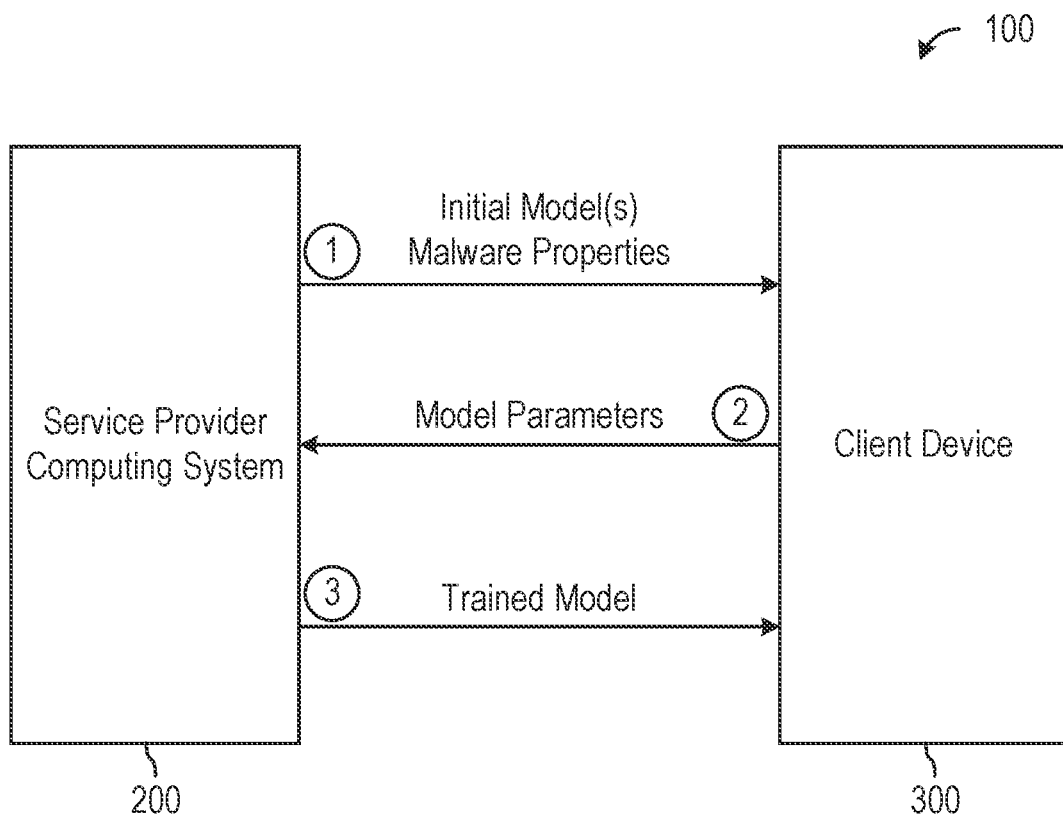
FIG. 1 is a block diagram of a communication architecture between a service provider computing system and a client device for generating and training malware detection models, according to some embodiments.

Turning first to FIG. 1, a block diagram of a communication architecture 100 between a service provider computing system 200 and a client device 300 is shown, according to some embodiments. At a high level, architecture 100 illustrates the flow (i.e., transfer) of data between system 200 and client device 300 when generating and training malware detection models via federated learning. In other words, architecture 100 is a federated learning architecture for generating and training malware detection models. As described in greater detail below, system 200 and client device 300 may send and receive data (i.e., communicate) via any suitable communication channels, such as via a direct connection or via a network (e.g., a VPN, the Internet, etc.). In some embodiments, communications between system 200 and client device 300 are encrypted or otherwise secured.

System 200 generally includes a computing device (e.g., a workstation, a server, etc.) or a group of computing devices that are operated by a cyber security service providers (CSSP). For example, system 200 may include a server that is hosted by a CSSP, either on-site (e.g., at a physical location associated with the CSSP) or remotely (e.g., at a secondary location). In some embodiments, system 200 includes a cloud server (e.g., hosted by a third party) that hosts software and/or other services offered by the CSSP. Client device 300 generally includes a computing device (e.g., a workstation, a server, a desktop or laptop computer, a smartphone, etc.) and/or a group of computing devices owned and/or operated by a client (i.e., customer) of the CSSP. In some embodiments, client device 300 is remote from system 200. For example, client device 300 may be physically located at a property associated with the client of the CSSP. While shown as including only a single client device 300 in FIG. 1, for simplicity's sake, it should be appreciated that architecture 100 can include any number of client devices 300 at any number of distinct locations. Put another way, system 200 can communicate with any number of client devices 300 to generate and train malware detection models. For example, system 200 may communicate with tens, hundreds, or thousands of client devices 300.

A "malware detection model," as described herein, is generally a machine learning model that predicts whether a file (e.g., a document, an image, a program, etc.) is malicious. For example, data relating to a file is provided to a malware detection model as an input, and the model outputs a prediction of maliciousness. In some embodiments, the output (e.g., prediction) of the model is a classification of the file (e.g., malicious or non-malicious). In some embodiments, the classification may be binary (e.g., a '1' or an identifier of "malicious" if the input file is predicted to be malicious or a '0' or an identifier of "clean" if the input file is predicted to be non-malicious). In some embodiments, additional classifications may be used (e.g., malicious, non-malicious, uncertain, etc.). In some embodiments, the output of the model is a malicious "score" (e.g., a fraction from 0-1) which indicates a predicted likelihood that the file is malicious. For example, a file with a maliciousness score of 0.86 or 86% is highly likely to be malicious. In some embodiments, the model outputs both a classification for the file (e.g., malicious or not malicious) and a confidence score, which indicates a confidence level of the prediction. For example, an output with a low confidence score (e.g., less than 0.5 or 50%) indicates that the classification for the file may be inaccurate.

To begin the federated learning process, system 200 may transmit (1) an initial malware detection model and, in some embodiments, a malware properties database, to client device 300. In general, the initial malware detection model, or simply "initial model," is a malware detection model that has either not been initially trained or that has not been retrained using data from client device 300, as described below. For example, the initial model may be trained using only stored (e.g., on system 200) training data, or generic training data, and therefore has not been modified (i.e., updated) or retrained to reflect data provided by client device 300. In some embodiments, the initial model is trained using the malware properties database prior to being transmitted to client device 300. The malware properties database, which is optionally transmitted (1) to client device 300, includes hashes or other identifiers for a plurality of known malicious and clean files. The malware properties database is generally maintained by system 200 and is updated by system 200 when new malicious files are identified (e.g., using the malware detection models described herein or other malware detection mechanisms by the CSSP or a third party). In some embodiments, the initial model is transmitted to client device 300 as part of, or with, a software application. For example, the initial model may be included in a download package for a software application that is being installed on client device 300.

After receiving the initial model and/or malware properties database, client device 300 is configured to train the initial model using local data. As will be described in greater detail below, client device 300 may first generate a training data set for training the initial model using local files. The training data set includes a plurality of local files and labels for the local files (e.g., malicious or not malicious) and is maintained only on the client device 300. That is, the training data set is not transmitted to the system 200 so as to ensure that any private or sensitive information contained in the local files is not transmitted outside of client device 300.

Specifically, client device may generate file characterization information, such as hashes or other identifying information, binary structure data, or other metadata, for a plurality of local files and subsequently compare the file information against the malware properties database to make an initial determination of whether each of the local files is malicious or not. It should be noted that the file characterization information does not include any data of the content of the file, such as any sensitive, personal, or private information, but rather only includes data that characterizes the file. In some embodiments, the comparison is performed locally on the client device 300. For example, the client device 300 receives the malware properties database from the system 200 as part of the transmission (1) of the initial model. In some embodiments, the comparison is performed on the system 200. For example, after characterizing the plurality of local files, the file characterization information, but not the contents of the file itself, are transmitted to the system 200 where a comparison is made against the malware properties database maintained at the system 200 for whether or not the local file is malware. A result of the comparison is transmitted from the system 200 to the client device 300.

When a match between identifying information (e.g., a hash, etc.) of a local file and identifying information (e.g., a hash, etc.) of a known malicious file is detected, client device 300 may label the local file as "malicious;" otherwise, each local file without a match in the malware properties database is evaluated using either the initial model or a previously-stored malware detection model to predict maliciousness. When a local file is predicted to be not malicious, the file may be labeled as "clean." In general, a file is only labeled as clean if the maliciousness score, generated by the model, is below a first threshold (e.g., 0.5) or if a confidence score of the prediction is above a second threshold (e.g., above 0.8). Once a file is labeled (e.g., "clean" or "malicious"), the file is stored with its label in the training data set on the client device 300. Additionally, or alternatively, malicious files may be quarantined, deleted, etc., and/or an alert may be presented to a user recommending that the malicious file be removed. If, however, a match in the malware properties database is not identified for a local file and the maliciousness of the file cannot be accurately predicted, the file may be flagged for additional evaluation, quarantined, discarded, and/or removed from the training data.

Once the training data is labeled, client device 300 may train the initial model using the labeled training data set. In some embodiments, the initial model is only trained once the training data reaches a predefined amount of data. For example, the initial model may not be trained until the training data set contains 1000 files, 10 MB of data, 100 MB of data, etc. In some embodiments, the labeled training data is also split into training, validation, and test sets. Training of the initial model is described in greater detail below but, at a high level, client device 300 may use the training set of the labeled training data to fit parameters (e.g., weights) of the initial model. For example, client device 300 may iteratively adjust the weights of the model by comparing the output of the model with a label for each input. Once the model is trained, it may be further refined on the client device 300, and the training validated using the validation and test sets of the labeled training data.

The parameters of the trained model, which generally include at least the weights of the trained model, may then be transmitted (2) from client device 300 to system 200. In some embodiments, client device 300 may also transmit model metadata. Model metadata may include, for example, a version (e.g., a number or other identifier) of the initial model, a list of features, etc. The version of the model may be useful in determining, by system 200, whether the model trained by client device 300 is current. For example, a version number of the model trained by client device 300 may be compared to a current model version maintained by system 200 to confirm that the features (e.g., variables that act as inputs to the model) utilized in the model trained by client device 300 match the features expected by system 200 (e.g., a current version of a federated model). For example, feature sets may vary over time as different sets of variables are identified to better classify whether or not a file is malicious. Due to the asynchronous timing of when client devices 300 return trained models (e.g., based on waiting for the local training data sets to reach a certain size), trained models for older versions with different feature sets may be received.

In some embodiments, client device 300 may also transmit characterizations (e.g., hashes, etc.) of newly-identified malicious files. The characterizations (e.g., hashes, etc.) of any newly-identified malicious files (e.g., as predicted by the model on client device 300) may be used, by system 200, to update the malware properties database. It is important to note, however, that the files used in the training data set by client device 300 and their contents remain on client device 300. In other words, client device 300 does not transmit any sensitive information or files to system 200, only characterizations (e.g., hashes) of malicious files, which protects the client's data.

System 200, having collected model parameters (e.g., weights) from a plurality of client devices 300, may aggregate (i.e., combine) the model parameters by retraining the initial model (e.g., a copy of which is maintained on system 200) based on the plurality of received model parameters or generating a new model based on the plurality of received model parameters. In some embodiments, system 200 generates multiple retrained models. In some embodiments, the model is retrained using various federated learning methods including federated stochastic gradient descent, federated averaging, and federated learning with dynamic regularization. It should be noted that this list of federated learning methods is provided as an example and is not intended to be limiting; rather, system 200 may use any suitable federated learning methods to generate a federated model based on the received model parameters from client devices 300.

In some embodiments, multiple versions of a federated model based on the retrained models are tested by system 200 using the malware properties database (e.g., either before or after being updated with the hashes or other characterizations of newly-identified malicious files) to identify a best-performing model. The best-performing model may be identified based on any number of metrics; however, in general, the best-performing model is the version of the retrained model that results in the most accurate predictions (e.g., most true positives and least false negatives, though other metrics are contemplated). Once a best-performing model is identified, system 200 may transmit (3) the best-performing/retrained model to client device 300 for use. In some embodiments, this process (e.g., the processes of FIGS. 4-5B, described below) is iteratively repeated (e.g., every day, every month, etc.) to continually retrain the model, ensuring that the malware detection model provided by system 200 to client devices 300 is up-to-date. Additional details of the training process are described below with respect to FIGS. 4 and 5.

CSSP Computing System

Figure 2:
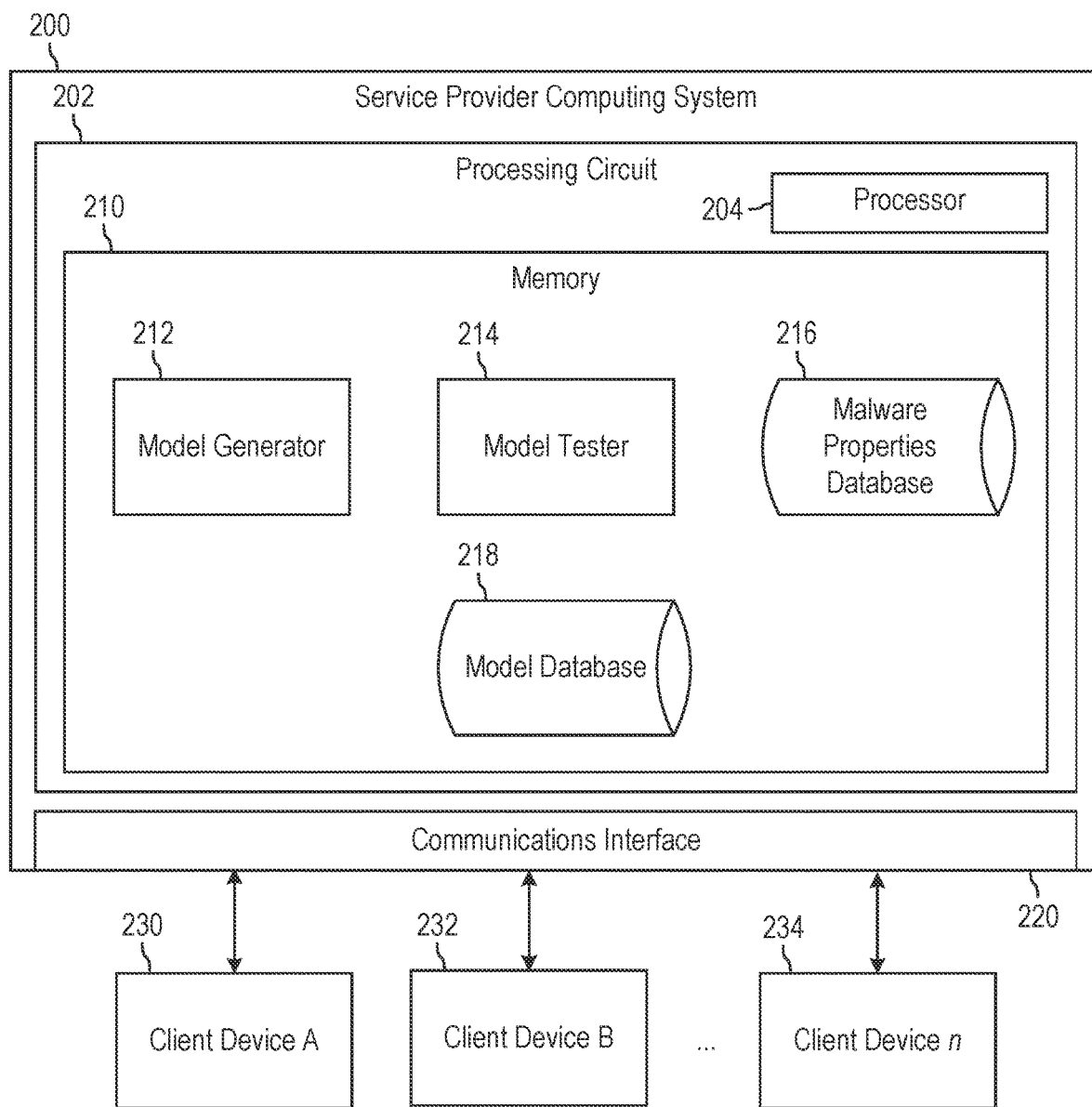
FIG. 2 is a detailed block diagram of the service provider computing system of FIG. 1, according to some embodiments.

Referring now to FIG. 2, a detailed block diagram of service provider computing system 200 is shown, according to some embodiments. As mentioned above, system 200 generally includes or is a computing device (e.g., a workstation, a server, etc.) or a group of computing devices that are operated by a CSSP. For example, system 200 be a server (e.g., a cloud server) operated by the CSSP and/or that hosts software and/or other services offered by the CSSP. System 200 is shown to include a processing circuit 202 that includes a processor 204 and a memory 210. Processor 204 can be a general-purpose processor, an application specific integrated circuit (ASIC), one or more field programmable gate arrays (FPGAs), a group of processing components, or other suitable electronic processing structures. In some embodiments, processor 204 is configured to execute program code stored on memory 210 to cause system 200 to perform one or more operations.

Memory 210 can include one or more devices (e.g., memory units, memory devices, storage devices, etc.) for storing data and/or computer code for completing and/or facilitating the various processes described in the present disclosure. In some embodiments, memory 210 includes tangible (e.g., non-transitory), computer-readable media that stores code or instructions executable by processor 204. Tangible, computer-readable media refers to any physical media that is capable of providing data that causes system 200 to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, memory 210 can include random access memory (RAM), read-only memory (ROM), hard drive storage, temporary storage, non-volatile memory, flash memory, optical memory, or any other suitable memory for storing software objects and/or computer instructions. Memory 210 can include database components, object code components, script components, or any other type of information structure for supporting the various activities and information structures described in the present disclosure. Memory 210 can be communicably connected to processor 204, such as via processing circuit 202, and can include computer code for executing (e.g., by processor 204) one or more processes described herein.

While shown as individual components, it will be appreciated that processor 204 and/or memory 210 can be implemented using a variety of different types and quantities of processors and memory. For example, processor 204 may represent a single processing device or multiple processing devices. Similarly, memory 210 may represent a single memory device or multiple memory devices. Additionally, in some embodiments, system 200 may be implemented within a single computing device (e.g., one server, one housing, etc.). In other embodiments, system 200 may be distributed across multiple servers or computers (e.g., that can exist in distributed locations). For example, system 200 may include multiple distributed computing devices (e.g., multiple processors and/or memory devices) in communication with each other that collaborate to perform operations. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. For example, virtualization software may be employed by system 200 to provide the functionality of a number of servers that is not directly bound to the number of computers in system 200.

Memory 210 is shown to include a model generator 212 configured to generate and train a malware detection model. Specifically, model generator 212 may be configured to generate an initial malware detection model and, in some embodiments, may train the initial model using data stored in a malware properties database 216. As described above, malware properties database 216 is a database of known malicious files and known clean files, which is maintained by a CSSP. Generally, malware properties database 216 includes hashes or other characterizations of a plurality of known malicious files and may also include various metadata associated with the known malicious files. As also described above, the malware detection model may be configured to predict whether a file (e.g., a document, an image, an executable file, etc.) is malicious. In some embodiments, the model classifies files as either malicious or clean (i.e., not malicious) and further returns a confidence score for the prediction. In general, the malware detection model is a supervised training model, such as a neural network model, a deep neural network model, a Support Vector Machine (SVM), a nearest neighbor model, a Naïve-Bayes model, a decision tree, a linear regression model, or the like. In some embodiments, the malware detection model is a TensorFlow Lite or a BITorch model, which are particularly suited for execution and training on client devices 300 due to their smaller model sizes, although other types of models are contemplated herein. In some embodiments, the initial malware detection model and/or historical versions of the malware detection model are stored in a model database 218. Further, model database 218 may maintain various metadata (e.g., version numbers, features, hyperparameters, metrics, etc.) for each of one or more stored models.

After generating and/or training the initial model using the data stored in malware properties database 216, model generator 212 may transmit the initial model to a plurality of client devices 230-234. As described herein, each of client devices 230-234 may be the same as, or functionally equivalent to, client device 300. As described in greater detail below, each of client devices 230-234 may then train the initial model using local data (i.e., data that is stored on client devices 230-234) to generate new or modified model parameters, which are then transmitted back to system 200 and model generator 212. Generally, the model parameters include at least weights for the model. After receiving model parameters from client devices 230-234, model generator 212 may regenerate and/or retrain the malware detection model. In some embodiments, model generator 212 generates multiple different versions of the malware detection model based on the received model parameters and, if any, other metadata. In some embodiments, model generator 212 uses various federated learning methods to retain the initial model, including one or more of federated stochastic gradient descent, federated averaging, and federated learning with dynamic regularization.

In some embodiments, system 200 also receives metadata for the initial model trained by each of client devices 230-234. Metadata may include, for example, an indication of a version (e.g., a version number) for the model trained by respective ones of client devices 230-234. The version of each model trained by client devices 230-234 can then be compared to a current version of the model maintained by model generator 212 (i.e., the initial model) to determine whether any of client devices 230-234 had trained an old or out-of-date version of the initial model. In some embodiments, even old or out-of-date versions of the trained model received from the client devices 230-234 may be used as long as the features in the current version of the model and the old model remain the same. However, if the old version of the model and the current version of the model use different features, then the old version of the model may be discarded. In some embodiments, system 200 also receives an updated version of malware properties database 216 or, at least, metadata and/or a hash of one or more newly-identified malicious files, from each of client devices 230-234. Newly-identified malicious files may be files that were determined to be malicious on any of client devices 230-234. Likewise, in some embodiments, client devices 230-234 may also send hashes and/or metadata of known clean files, to further improve malware properties database 216.

In some embodiments, system 200 also receives features from one or more unknown or unclassifiable files from each of client devices 230-234. For example, if one of client devices 230-234 cannot determine whether a file is malicious, the client device may extract features from the unclassifiable file and may transmit the features back to system 200 for analysis and/or to be stored in malware properties database 216. Features may include any metadata associated with a file that does not contain sensitive or private data, such as the file header, compiler type, binary structures, etc. In some embodiments, the features are received by system 200 as a matrix formed from multiple vectors, each associated with a file. In some cases, there is a possibility that system 200 receives files or features that include sensitive and/or private information. Accordingly, in some such embodiments, system 200 may determine (e.g., by evaluating the features or file metadata and/or by scanning the file) whether each file contains sensitive and/or private information and, if so, may discard (i.e., delete) the associated file to protect client confidentiality.

Memory 210 is also shown to include a model tester 214 that tests the retrained malware detection model and/or one or more versions of the retrained model. Specifically, model tester 214 can execute multiple versions of the retrained model using the data in malware properties database 216 to identify a best-performing model, or version of the retrained model. In some embodiments, the best-performing model is the model that most accurately predicts whether a file is malicious. For example, model tester 214 may determine the best-performing model based on the confidence scores returned by each tested model. In some embodiments, model tester 214 executes a model scoring function to determine the best-performing model. However, it should be appreciated that other parameters may be considered when determining the best-performing model. Once a best-performing model is determined, model tester 214 may transmit the model to each of client devices 230-234. Additionally, in some embodiments, model tester 214 may store a copy of the best-performing model in model database 218.

Still referring to FIG. 2, system 200 is also shown to include a communications interface 220. Communications interface 220 may facilitate communications between system 200 and any external components or devices, including client devices 230-234. For example, communications interface 220 can provide means for transmitting data to, or receiving data from, client devices 230-234. Accordingly, communications interface 220 can be or can include a wired or wireless communications interface (e.g., jacks, antennas, transmitters, receivers, transceivers, wire terminals, etc.) for conducting data communications, or a combination of wired and wireless communication interfaces. In some embodiments, communications via communications interface 220 are direct (e.g., local wired or wireless communications) or via a network (e.g., a WAN, the Internet, a cellular network, etc.). For example, communications interface 220 may include one or more Ethernet ports for communicably coupling system 200 to a network (e.g., the Internet). In another example, communications interface 220 can include a WiFi transceiver for communicating via a wireless communications network. In yet another example, communications interface 220 may include cellular or mobile phone communications transceivers.

Client Device

Figure 3:
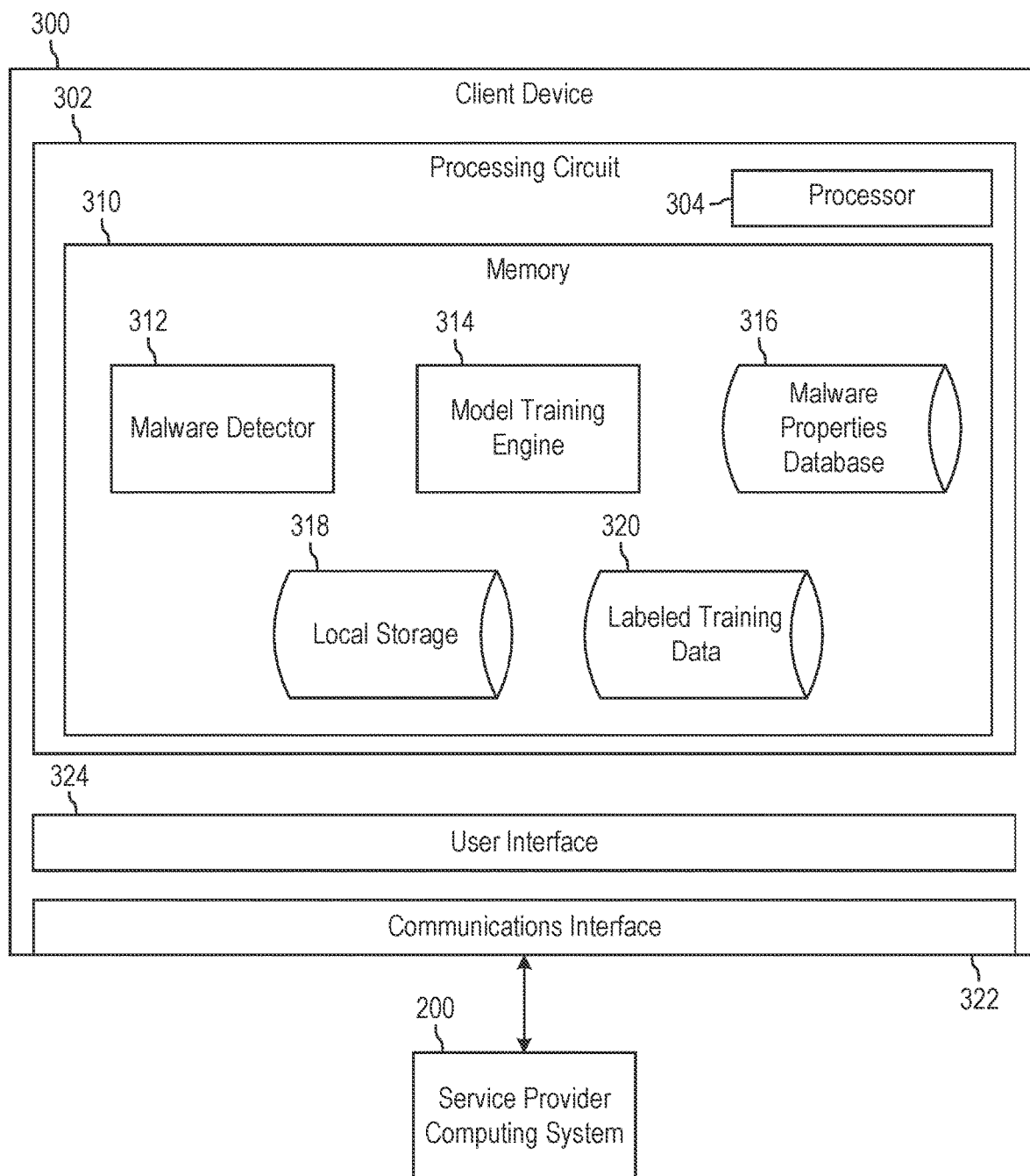
FIG. 3 is a detailed block diagram of the client device of FIG. 1, according to some embodiments.

Referring now to FIG. 3, a detailed block diagram of client device 300 is shown, according to some embodiments. As mentioned above, client device 300 generally is a computing device (e.g., a workstation, a server, a desktop or laptop computer, a smartphone, etc.) and/or a group of computing devices owned that is operated by a client (i.e., customer) of a CSSP. It should be noted that each of client devices 230-234 may be the same as or functionally equivalent to client device 300. Client device 300 is shown to include a processing circuit 302 that includes a processor 304 and a memory 310. Processor 304 can be a general-purpose processor, an ASIC, one or more FPGAs, a group of processing components, or other suitable electronic processing structures. In some embodiments, processor 304 is configured to execute program code stored on memory 310 to cause client device 300 to perform one or more operations.

Memory 310 can include one or more devices (e.g., memory units, memory devices, storage devices, etc.) for storing data and/or computer code for completing and/or facilitating the various processes described in the present disclosure. In some embodiments, memory 310 includes tangible (e.g., non-transitory), computer-readable media that stores code or instructions executable by processor 304. Tangible, computer-readable media refers to any physical media that is capable of providing data that causes client device 300 to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, memory 310 can include RAM, ROM, hard drive storage, temporary storage, non-volatile memory, flash memory, optical memory, or any other suitable memory for storing software objects and/or computer instructions. Memory 310 can include database components, object code components, script components, or any other type of information structure for supporting the various activities and information structures described in the present disclosure. Memory 310 can be communicably connected to processor 304, such as via processing circuit 302, and can include computer code for executing (e.g., by processor 304) one or more processes described herein.

While shown as individual components, it will be appreciated that processor 304 and/or memory 310 can be implemented using a variety of different types and quantities of processors and memory. For example, processor 304 may represent a single processing device or multiple processing devices. Similarly, memory 310 may represent a single memory device or multiple memory devices. Additionally, in some embodiments, client device 300 may be implemented within a single computing device (e.g., one server, one housing, etc.). In other embodiments, client device 300 may be distributed across multiple servers or computers (e.g., that can exist in distributed locations). For example, client device 300 may include multiple distributed computing devices (e.g., multiple processors and/or memory devices) in communication with each other that collaborate to perform operations. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. For example, virtualization software may be employed by client device 300 to provide the functionality of a number of servers that is not directly bound to the number of computers in client device 300.

Memory 310 is shown to include a malware detector 312 configured to detect malicious local files (i.e., files stored on client device 300). In some embodiments, malware detector 312 detects malicious files by comparing each of a plurality of local files, generally maintained in local storage 318, to a malware properties database 316. Malware properties database 316 is generally a copy of malware properties database 216 received from system 200; however, malware properties database 316 may alternatively be a locally-maintained malware properties database that is updated based on malware properties database 216. In either case, malware properties database 316 may include characterizations (e.g., hashes, etc.) of a plurality of known malicious files. In some embodiments, prior to comparing the local files to malware properties database 316, malware detector 312 generates characterizations (e.g., hashes, etc.) of the local files. Accordingly, the characterizations (e.g., hashes, etc.) of the local files may be directly compared to the characterizations (e.g., hashes, etc.) of known malicious files.

By comparing the local files to the known malicious files, malware detector 312 can detect matches (e.g., between the characterizations of a local file and the characterizations of a known malicious file) which indicate that the identified (e.g., matched) local file is malicious or that the identified local file is most likely malicious. For example, if the characterizations (e.g., a hash) of a first local file match at least one known malicious file, the first local file can be identified as "malicious." In some embodiments, malware detector 312 is configured to generate a training data set, shown in FIG. 3 as labeled training data 320, by labeling identified malicious files as "malicious." Similarly, malware detector 312 may label files that are determined not to be malicious as "clean." However, if a local file cannot be identified as malicious or clean (e.g., if no match is found in malware properties database 316), malware detector 312 may further evaluate the unknown/unlabeled file using the initial malware detection model received from system 200. However, it should be appreciated that, in some embodiments, client device 300 may simply flag or otherwise identify files that cannot be readily classified as clean or malicious such that the flagged/identified files can be evaluated by system 200 using a similar process to that which is described below.

To determine whether a file is malicious, if a match cannot be identified in malware properties database 316, malware detector 312 may first extract features from the file. As mentioned above, features are generally variables associated with the file that are used as inputs to the malware detection model described herein. Accordingly, malware detector 312 may provide the extracted features as inputs to the initial model. It will be appreciated that any of a variety of features can be extracted from the file; however, in general, only features that do not include private, personal, or sensitive information are extracted. For example, malware detector 312 may extract features such as the file header, type of compiler, binary structures, etc. Subsequently, malware detector 312 executes the initial model using the extracted features to generate an output, which is generally a prediction of whether the file is malicious. In some embodiments, the output (e.g., prediction) of the model is a classification of the file (e.g., malicious or non-malicious). In some embodiments, the classification may be binary (e.g., a '1' or an identifier of "malicious" if the input file is predicted to be malicious or a '0' or an identifier of "clean" if the input file is predicted to be non-malicious). In some embodiments, additional classifications may be used (e.g., malicious, non-malicious, uncertain, etc.). In some embodiments, the output of the model is a malicious "score" (e.g., a fraction from 0-1) which indicates a predicted likelihood that the file is malicious.

In some embodiments, the model outputs both a classification for the file (e.g., malicious or not malicious) and a confidence score, which indicates a confidence level of the prediction. In some embodiments, malware detector 312 determines a maliciousness score based on the prediction and the confidence score, which indicates a likelihood that the file is malicious. In some embodiments, a file is determined to be malicious only if the confidence score and/or the maliciousness score meets or exceeds a threshold. For example, a file may only be identified as malicious (e.g., by malware detector 312) if the confidence score of a "malicious" prediction is above 0.75 or 75%. Once a prediction is generated and, in some embodiments, the confidence score of the prediction is determined to meet or exceed a threshold, malware detector 312 may label the file according to the prediction. Subsequently, the predicted malicious or clean file is added to labeled training data 320. In some embodiments, if a file is predicted to be malicious, malware detector 312 further stores the extracted features and/or file characterization information of the malicious file in malware properties database 316. For example, malware detector 312 may update malware properties database 316 to include data corresponding to the newly-identified malicious file. However, as mentioned above, malware detector 312 does not store any private or sensitive data.

Memory 310 is also shown to include a model training engine 314 that is configured to train the initial malware detection model. Specifically, model training engine 314 may utilize labeled training data 320 to train the initial model. At a high level, model training engine 314 may separate labeled training data 320 into three separate subsets, including a training set, a validation set, and a test set. The initial model is then trained by first executing the initial model using the training set to generate and/or modify the model weights, then validating and/or testing the trained model using the validation and training sets. For example, client device 300 may adjust the weights of the model by comparing the output of the model with a target for each input and, once the weights of the model are determined, may validate and test the model for accuracy. In some embodiments, the initial model is only trained once labeled training data 320 reaches a predefined amount of data. For example, the initial model may not be trained until labeled training data 320 contains 1000 files, 10 MB of data, 100 MB of data, etc. In some embodiments, model training engine 314 stores a copy of the trained model and/or model parameters (e.g., weights) in local storage 318. In some embodiments, model training engine 314 transmits the model parameters to system 200. Accordingly, as noted above, client device 300 advantageously does not transmit any private or sensitive client data.

Still referring to FIG. 3, client device 300 may also include a user interface 324 that allows a user (e.g., an operator of client device 300) to interact with client device 300. User interface 324 may include, for example, a display screen (e.g., LCD, LED, etc.) that can display graphical user interfaces (GUIs) having text, data, graphics, videos, animations, etc. In some embodiments, user interface 324 also includes a user input device, such as a keyboard, a keypad, a joystick, a mouse, etc. In some embodiments, user interface 324 includes a touchscreen that can both display GUIs and receive user inputs (e.g., in the form of a touch). In some embodiments, client device 300 is configured to generate and present GUIs via user interface 324. For example, client device 300 may generate GUIs that indicate identified malicious files or that indicate a status of the malware detection and model training processes disclosed herein.

Client device 300 is also shown to include a communications interface 322. Communications interface 322 may facilitate communications between client device 300 and any external components or devices, including system 200. For example, communications interface 322 can provide means for transmitting data to, or receiving data from, system 200. Accordingly, communications interface 322 can be or can include a wired or wireless communications interface (e.g., jacks, antennas, transmitters, receivers, transceivers, wire terminals, etc.) for conducting data communications, or a combination of wired and wireless communication interfaces. In some embodiments, communications via communications interface 322 are direct (e.g., local wired or wireless communications) or via a network (e.g., a WAN, the Internet, a cellular network, etc.). For example, communications interface 322 may include one or more Ethernet ports for communicably coupling client device 300 to a network (e.g., the Internet). In another example, communications interface 322 can include a WiFi transceiver for communicating via a wireless communications network. In yet another example, communications interface 322 may include cellular or mobile phone communications transceivers.

Model Generation and Training

Figure 4:
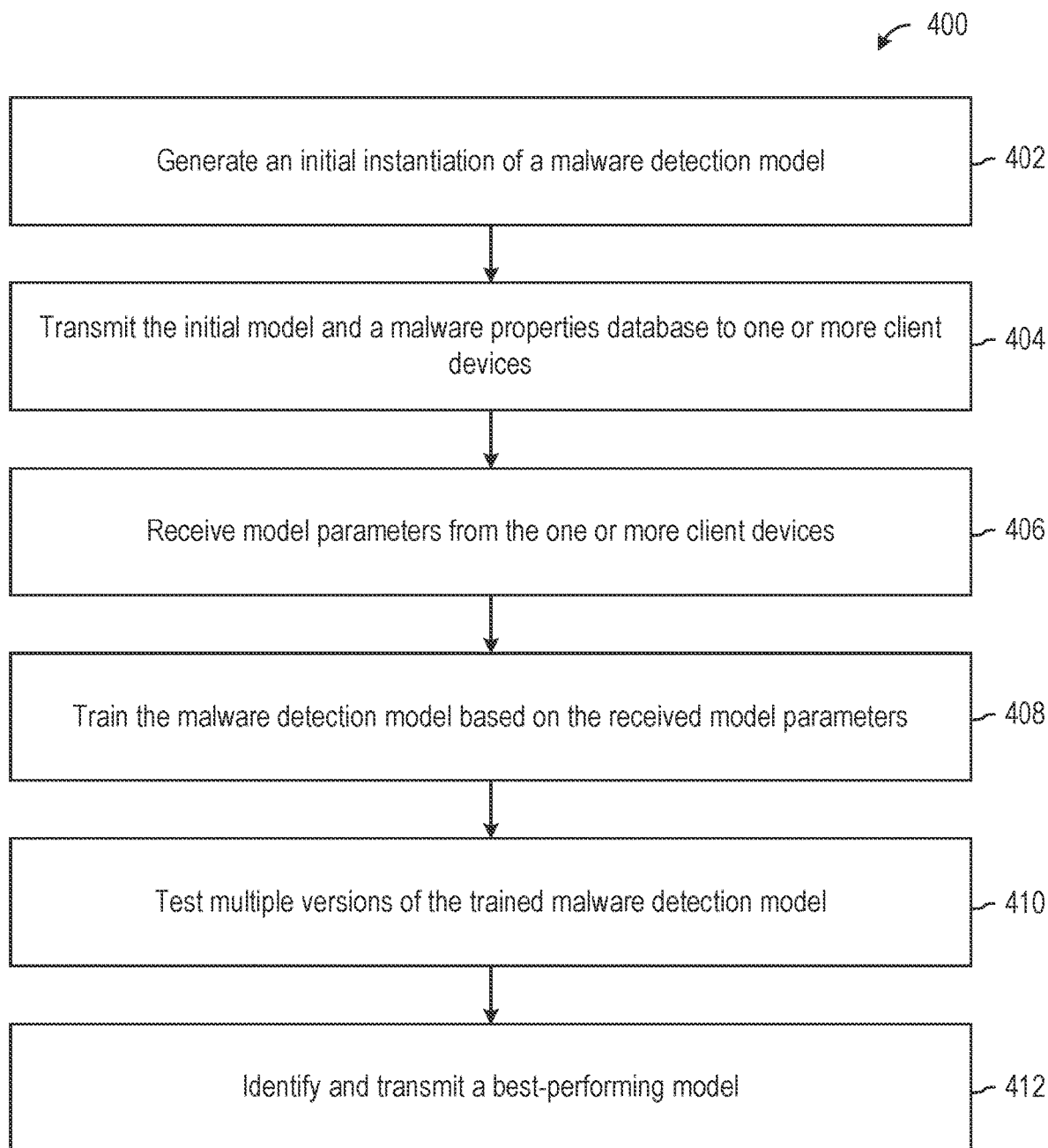
FIG. 4 is a flow diagram of a process for generating a malware detection model on the service provider computing system of FIG. 1 using federated learning, according to some embodiments.

Referring now to FIG. 4, a flow diagram of a process 400 for generating a malware detection model is shown, according to some embodiments. In particular, process 400 is used to generate a malware detection model via federated learning. Unlike other methods of generating or updating malware detection models, process 400 advantageously uses local data on one or more client devices to generate a robust model that accounts for individual client preferences and that uses a wider variety of file types (e.g., documents, images, executable files, etc.) than other methods. Further, by implementing process 400, the computational burden of training a malware detection model using a large dataset (e.g., malware properties database 216) on CSSP infrastructure (e.g., system 200) is reduced. Instead, each of a plurality of client devices trains an instantiation of the model using a much smaller, local dataset, and the results of the individual trainings are combined by the CSSP's system. In some embodiments, process 400 is implemented by system 200, as described above, although certain steps of process 400 may also be implemented by client device 300 or another computing device. It will be appreciated that certain steps of process 400 may be optional and, in some embodiments, process 400 may be implemented using less than all of the steps.

At step 402, an initial instantiation, also be considered to as a "first version" of the model for the purpose of this description, of a malware detection model is generated. As mentioned above, the malware detection model is a predictive model that classifies files (e.g., documents, images, executable files, text files, video files, etc.) as either malicious or "clean"/non-malicious. In some embodiments, the malware detection model is a supervised training model, such as a neural network model, a Support Vector Machine (SVM), a nearest neighbor model, a Naïve-Bayes model, a decision tree, a linear regression model, or the like. As mentioned above, the model may be a TensorFlow Lite or BITorch model, for example. As described herein, an "initial instantiation" of the malware detection model generally refers to a malware detection model that has only been trained using a preexisting malware properties database (e.g., malware properties database 216) or that has not been updated with new data from one or more client devices (e.g., client device 300). For example, the initial installation of the model may be a new model that is only trained with a preexisting malware properties database (e.g., containing characterizations of known malicious files) maintained by a CSSP on the CSSP's infrastructure (e.g., system 200). As another example, the initial installation of the model may refer to a model that had previously been trained using aggregate data from one or more client devices, as described below, but that is not updated with new data.

Accordingly, in some embodiments, generating the initial instantiation of the model includes training a malware detection model using a malware properties database; however, it will be appreciated that the "initial instantiation" of the model discussed herein may also refer to a malware detection model that was previously generated using process 400. To this point, it should also be appreciated the initial instantiation of the model is not limited to the first-ever instantiation of the model but rather refers to an "initial" version of model for the purposes of this description. In some embodiments, the initial instantiation of the model is further trained using portable executable files that were previously received from client devices (e.g., client devices 230-234), which generally do not include sensitive or private data.

At step 404, the initial instantiation of the malware detection model is transmitted to one or more client devices, such as client devices 230-234. In some embodiments, the initial instantiation of the model is received as part of the installation of a software application. Once received by client devices 230-234, as will be described in greater detail below with respect to FIG. 5, each of client devices 230-234 may train the malware detection model using local files. For example, each of client devices 230-234 may generate a training data set from one or more local files and may use the training data set to train the model locally, as described below with respect to FIG. 5. Notably, each of client devices 230-234 may train the model independently to generate a plurality of uniquely trained models or "versions" of the model. Each of the trained models may have a unique set of parameters (e.g., model weights), which are transmitted to system 200.

In some embodiments, step 404 also includes transmitting a malware properties database to each of the one or more client devices. Alternatively, the one or more client devices may remotely access a malware properties database maintained by the CSSP (e.g., on system 200). For example, system 200 may transmit a link to the malware properties database. In some embodiments, multiple different types of malware detection models may be generated at step 402 and transmitted to client devices 230-234 at step 404. Specifically, the multiple different "types" of models may each have a different architecture. For example, a first model may be a deep neural network model and a second model may be a Random Forest model. Accordingly, client devices 230-234 may train multiple different models simultaneously or concurrently.

In some embodiments, a second instantiation of the malware detection model is also transmitted to client devices 230-234 at step 404. Where the first model (i.e., the initial instantiation) is previously trained using a malware properties database and portable executable files, as described above, the second instantiation of the malware detection model may be untrained. In this manner, both a trained and untrained model may be transmitted to each of client devices 230-234. For example, the trained model may be used by client devices 230-234 to predict whether local files are malicious while the untrained model may be trained by client devices 230-234 using the federated learning processes described herein.

At step 406, the model parameters are received from each of the one or more client devices. As mentioned above, the model parameters generally include at least a set of weights for the model trained by respective ones of client devices 230-234. Accordingly, system 200 may receive a plurality of unique model weights corresponding to the malware detection model. In some embodiments, at step 406, an updated version of the malware properties database and/or metadata relating to one or more newly-identified malicious files is received from client devices 230-234. For example, client devices 230-234 may identify malicious files by comparing local files against the malware properties database and/or by predicting a file's maliciousness using the initial instantiation of the model, as described below with respect to FIG. 5. When a malicious file is detected (e.g., either directly or by a prediction), characterizations of the file (e.g., a hash of the file) and, in some embodiments, any additional and non-private metadata (i.e., extracted features) relating to the file, is transmitted to system 200 or is used to update the malware properties database, which is then transmitted to system 200. To this point, it should be appreciated that system 200 does not receive any sensitive or private data from any of client devices 230-234.

In some embodiments, the metadata for the model trained by client devices 230-234 is also received at step 406. The metadata may provide various information about the model including, at least, a version of the model. The version of the model may be a version number, or even a date on which the initial instantiation of the model was generated, which can be used to determine whether the model trained by each of client devices 230-234 is current. Checking for out-of-date models may be particularly important for federated learning, as one or more of client devices 230-234 may train an older version of the model than the others, or than what was transmitted by system 200. For example, since process 500 may be regularly or continuously repeated, it is possible that one or more of client devices 230-234 was offline (e.g., turned off, disconnected from a network, etc.) and did not receive the initial instantiation of the model; however, the offline client device may have an older version of the model saved. Thus, when the client device is turned on, reconnected to the network, etc., the client device may return features associated with an older version of the model. As noted above, feature sets may vary over time as different sets of variables are identified to better classify whether or not a file is malicious. Due to the asynchronous timing of when client devices 230-234 train the initial model and/or return trained model parameters (e.g., based on waiting for the local training data sets to reach a certain size), trained models for older versions with different feature sets may be received. Accordingly, it should be appreciated that, in some embodiments, the model version number is a "mandatory" parameter that is provided by each of client devices 230-234 at step 406.

Accordingly, at or after step 406, system 200 may compare the version (e.g., version number) of the model trained by each of client devices 230-234 (e.g., determined based on model metadata) to a current version of the model maintained by system 200 (e.g., the initial instantiation of the model). If the version of the model trained by each of client devices 230-234 matches the current version of the model, then the model parameters received from each of client devices 230-234 may be considered valid. However, if it is determined that one or more of the client devices had trained an out-of-date model, the parameters transmitted by the offending client device(s) may be considered invalid. In some embodiment, the invalid parameters are flagged, ignored, or deleted. In some embodiments, a notification is transmitted to the offending client device(s). For example, the notification may indicate to a user of the client device that the malware detection model implemented by the client device is out-of-date. In some embodiments, the notification may cause the client device to download the current version of the model from system 200.

In some embodiments, even if a client device is determined to have trained an out-of-date model, the parameters transmitted by the offending device may not be discarded. Rather, in some such embodiments, the version of the model trained by the offending device may be evaluated to determine whether the feature set of the out-of-date model matches a feature set of a current model in system 200. For example, the version number of the out-of-date model may be used to query a model database (e.g., model database 218) to determine the feature set of the out-of-date model, which can then be compared to a feature set of the current model. If the feature sets match, then the parameters received from the offending model may be used to retrain the model (e.g., at step 408) regardless of whether the model was out-of-date. If the feature sets do not match, then the parameters received from the offending model may be discarded. As described herein, a feature set for the malware detection model may indicate features used for machine learning, including file size, file type, etc. Accordingly, each version of the malware detection model may have a feature set which can change as the model is regenerated, retrained, updated, etc.

At step 408, the malware detection model is retrained using the received model parameters. Alternatively, a new malware detection model is generated at step 408. In some embodiments, the malware detection model is retrained, or a new model is generated, using one or more federated learning techniques, including at least one of federated stochastic gradient descent, federated averaging, or dynamic regularization. Additional federated learning techniques can include federated learning with personalization (e.g., each client may have their own preferences of security), federated matched averaging, and federated learning for pervasive computing. Accordingly, the retrained or newly generated model can be considered a federated model, as described herein. In some embodiments, the model parameters (e.g., weights) received from each of client devices 230-234 are aggregated and averaged to determine a set of parameters for the federated (i.e., retrained) model. For example, the plurality of model weights may be averaged, and the average weights may be used to replace the weights of the initial model prior to training (e.g., using malware properties database 216). In some embodiments, rather than combining the model parameters from client devices 230-234, multiple versions of the federated model are generated. For example, the weights/parameters received from client devices 230-234 may each be used to train/generate a version of the federated model.

At step 410, multiple versions of the retrained malware detection model (e.g., each with different weights) are tested. In some embodiments, multiple versions of a federated model based on the retrained model(s) are tested. For example, each version of the retrained or federated malware detection model may be executed using the data in malware properties database 216, either before or after being updated with newly-identified files at steps 404/406, to determine a best-performing model. The best-performing model may be determined based on any number of metrics; however, in general, the best-performing model is the version of the retrained model that results in the most accurate predictions (e.g., the most true positives and/or the least false negatives). For example, the best-performing model may have the highest average confidence scores. In some embodiments, the best-performing model is also compared to one or more historical (e.g., previously-saved) models to determine whether the best-performing model is more accurate than an old model. For example, in some embodiments, an older model (i.e., older version of the model) may perform better than the retrained malware detection model, in which case the older model may be deemed the "best performing."

Once a best-performing model is identified, at step 412, the best-performing model is transmitted to the one or more client devices (e.g., client devices 230-234). From there, each of client devices 230-234 may use the best-performing model for malware detection. Additionally, or alternatively, process 500 may repeat once the best-performing model is received by client devices 230-234. For example, after receiving the best-performing model, client devices 230-234 may retrain the best-performing model using local data, transmit the resulting model parameters to system 200, etc. In some embodiments, process 500 is repeated on a regular basis, such as every day, every week, every month, etc. In some embodiments, rather than transmitting the best-performing model directly to client devices 230-234, a notification may be sent to client devices 230-234 that indicates that a new model is available for download. Thus, users of client devices 230-234 may have control over when new models are downloaded.

Figure 5:
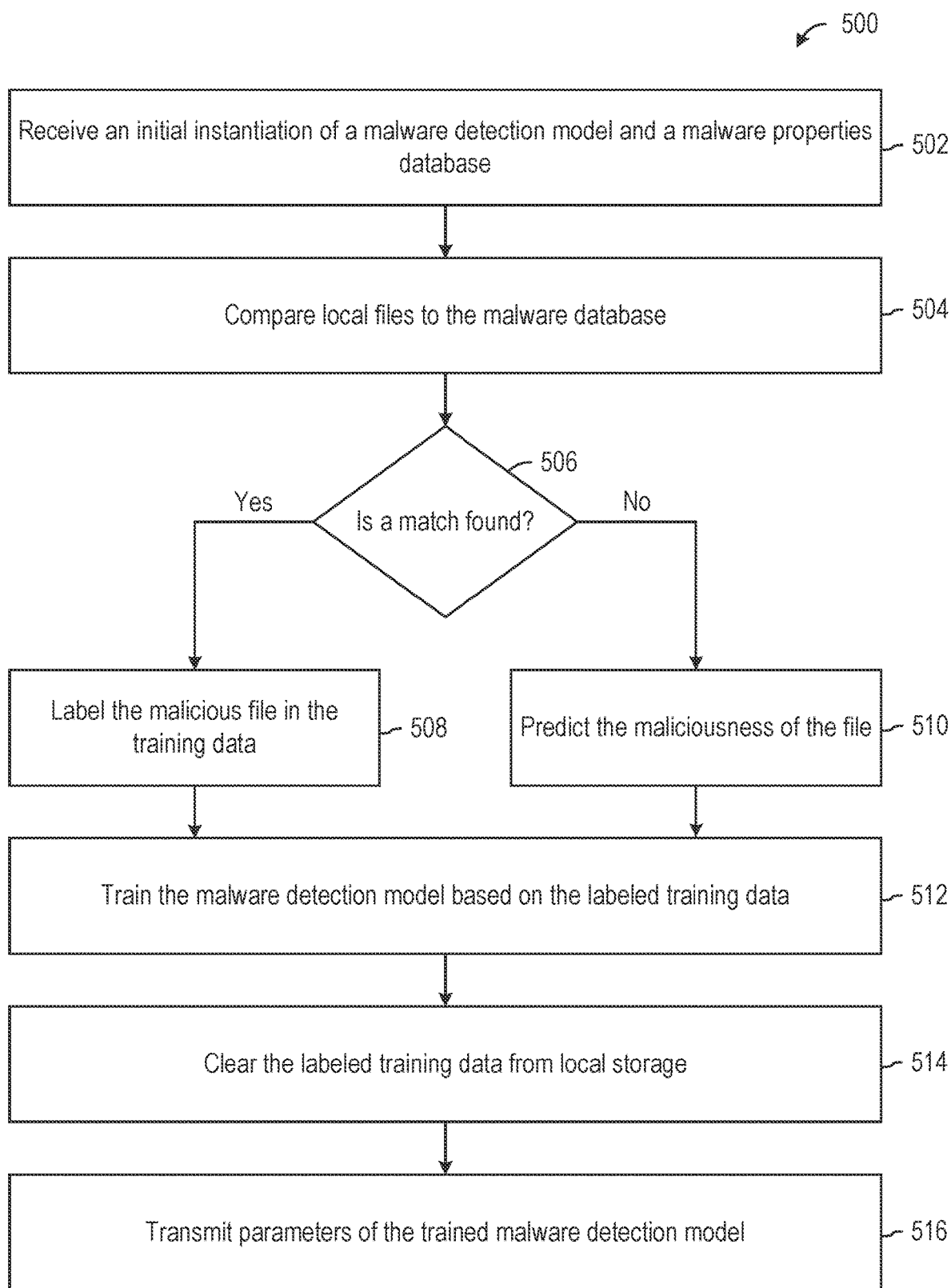
FIG. 5 is a flow diagram of a process for training a copy of a malware detection model on the client device of FIG. 1, according to some embodiments.

Referring now to FIG. 5 a flow diagram of a process 500 for detecting malware and training a malware detection model is shown, according to some embodiments. At a high level, process 500 is part of a federated learning process (e.g., in conjunction with process 400) that results in a robust malware detection model that is trained based on local files on each of one or more client devices, without requiring the client devices to transmit (e.g., to system 200) sensitive or private data. Accordingly, it will also be appreciated that, in some embodiments, process 500 is implemented in conjunction with process 400, described above. For example, various steps of process 500 may be performed prior to or after corresponding steps of process 400. In some embodiments, process 500 is implemented by client device 300, although certain steps of process 500 may also be implemented by system 200 or another computing device. It will also be appreciated that certain steps of process 500 may be optional and, in some embodiments, process 500 may be implemented using less than all of the steps.

At step 502, an initial (i.e., first) instantiation of a malware detection model and a malware properties database are received. Generally, the initial instantiation of the malware detection model and the malware properties database are the same as, or equivalent to, the initial model and the malware properties database described above with respect to step 402 of process 400. Accordingly, the model and the malware properties database are generally received from system 200. In some embodiments, rather than receiving a complete malware properties database, a link to a malware properties database is received. In such embodiments, client device 300 may automatically navigate to the link to update a local malware properties database or to access a malware properties database maintained on system 200 remotely. In some embodiments, a second model (e.g., a second instantiation of the malware detection model) is also received at step 502. In some such embodiments, one of the first or second models is trained while the other model is untrained. In this manner, the trained model may be used to predict file maliciousness, as described below, while the untrained model is trained by process 500. In some embodiments, multiple different models (e.g., each having a unique architecture) are received.

At step 504, local files (e.g., files stored on client device 300) are compared to the malware properties database. Put another way, client device 300 performs an initial malware scan using the malware properties database. In some embodiments, client device 300 scans all local files for malware. In other embodiments, client device 300 scans only a portion of its locally-maintained files. For example, client device 300 may scan only certain file types (e.g., executable files, text files, etc.). In some embodiments, client device 300 first generates file characterizations (e.g., hashes) for each local file and subsequently compares the file characterizations to the malware properties database. In this manner, a match between the characterization of a local file and a characterization (e.g., hash) of a known malicious file can easily be identified. To this point, client device 300 compares the characterizations of the local files to the malware properties database to identify matches at step 506. As mentioned above, file characterization information typically does not include any data of the content of the file, such as any sensitive, personal, or private information, but rather only includes data that characterizes the file.

It should be noted that, in some embodiments, step 504 is performed on the system 200 rather than on client device 300. For example, after characterizing the plurality of local files, the file characterization information, but not the contents of the file itself, are transmitted to the system 200 where a comparison is made against the malware properties database maintained at the system 200 for whether or not the local file is malware. A result of the comparison is transmitted from the system 200 to the client device 300.

If a match between the identifying information (e.g., hash, etc.) of a local file hash and the identifying information (e.g., hash, etc.) of a known malicious file is identified (step 506), the local file is labeled as malicious (step 508). In some embodiments, rather than labeling the local file directly, characterization data (e.g., a hash, etc.) of the local file is associated with either a malicious or non-malicious/clean label. The labeled malicious files may then be added to, or used to generate, a labeled training data set. The labeled training data generally includes a database or list of local file characterizations (e.g., not the files themselves) and their determined maliciousness (e.g., malicious or clean). Additionally, if a local file is determined to be malicious, the malicious file may be quarantined from client device 300. For example, the malicious file may be moved to a secure folder or database. In some embodiments, the labeled training data acts as a quarantine "folder" for malicious files.

If, however, a match between a local file and a known malicious file cannot be identified, and therefore the local file cannot be labeled, then a maliciousness of the unlabeled local file is predicted (step 510). In some embodiments, maliciousness is predicted using the initial instantiation of the malware detection model received at step 502. In some embodiments, where both a trained and untrained version of the model are received, the trained model may be used to predict maliciousness. In other embodiments, a locally trained model is used to predict the maliciousness of unlabeled files. In any case, when a file cannot be matched to a known malicious file, client device 300 may first extract features from the file. Features may include a variety of data associated with the local file; however, client device 300 may only extract features that do not include sensitive or private information. The features may then serve as inputs to the malware detection model, which subsequently outputs a predicted maliciousness. In some embodiments, the output is a binary classification (e.g., malicious or clean), as described above. In some such embodiments, the model may also return a confidence score for the prediction, where a high confidence score indicates a likelihood that the prediction is accurate. In some embodiments, the model outputs a maliciousness score, or a maliciousness score is calculated from the confidence score. A maliciousness score may indicate a likelihood of maliciousness.

In some embodiments, a file is only labeled as malicious if the confidence score of the prediction or the maliciousness score meets or exceeds a predefined threshold. For example, a file may only be labeled as malicious if the confidence score exceeds 0.7 or 70%. If the confidence score is below 0.7, then the file may be labeled as clean. In some embodiments, a second threshold may be set for labeling a file as "clean." For example, if the confidence score for a prediction is only 0.5 or 50%, rather than labeling the file as clean, the file may be flagged. In some embodiments, files that cannot be labeled as either clean or malicious may be quarantined or stored for later review. In some such embodiments, features of the unidentifiable files may be extracted and transmitted to system 200 for further review. In some embodiments, the unidentifiable files are presented to a user (e.g., of client device 300) such that the user can choose whether to quarantine the file, delete the file, label the file as clean, etc. In some embodiments, unidentifiable files are not included in the labeled training data.

At step 512, the initial instantiation of the malware detection model is trained using the labeled training data. In some embodiments, where multiple different models (e.g., each having a unique architecture) are received at step 502, each of the multiple different models are trained simultaneously or concurrently. In some embodiments, labeled training data is first split into training, validation, and/or test sets prior to training the model. Accordingly, the training data set may be used to train the model, whereas the validation and test sets are used to validate the model's training and to test the model, respectively. Training the model involves executing the model using the labeled training data to iteratively adjust the model's parameter (e.g., weights). Various training techniques for machine learning models can be used, such as stochastic gradient descent, dynamic regularization, etc. In some embodiments, the model is only trained once the labeled training data reaches a particular size or amount of data. For example, the model may only be trained once the labeled training data reaches 1000 files, 10 MB of data, 50 MB of data, 100 MB of data, etc. Accordingly, steps 504-510 of process 500 may be continuously repeated until the labeled training data reaches a threshold size or amount. In some embodiments, the initial instantiation of the model is trained a predefined number of times. For example, the model may be trained 10 times, 1000 times, etc.

Subsequently, at step 514, the labeled training data is cleared from local storage to protect private, sensitive, or personal information. Then, at step 516, the parameters of the trained malware detection model are transmitted to system 200. As mentioned above, the parameters typically include at least the weights of the trained model. If the model is trained multiple times, then parameters for the most recently trained model may be transmitted. After receiving the model parameters from multiple client devices, system 200 retrains the malware detection model using federated learning techniques and transmits a best-performing malware detection model (e.g., a federated model) back to the client devices. The client devices may then use the best-performing malware detection model for future malware identification. In some embodiments, after receiving the best-performing model, process 400 may repeat (e.g., where the best-performing malware detection model is the initial model received at step 502). Accordingly, it will be appreciated that processes 400 and 500 may regularly (e.g., every day, every week, every month, etc.) or continuously repeat to ensure that the malware detection models implemented by client devices 230-234 are up-to-date and accurate.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. It is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes. "Optional" or "optionally" means that the subsequently described event or circumstance may or may not occur, and that the description includes instances where said event or circumstance occurs and instances where it does not.

What is claimed is:

1. A malware detection method that uses federated learning, the method comprising:
    transmitting, to a remote device, file characterization information for one or more local files, wherein the remote device generates a labeled training data set by: i) comparing the file characterization information of each of the one or more local files to a malware properties database, and ii) labeling each of the one or more files as either malicious or clean based on the comparison;
    receiving, from the remote device, a first malware detection model and the labeled training data set;
    training the first malware detection model using the labeled training data set;
    transmitting parameters of the trained first malware detection model to the remote device; and
    receiving, from the remote device, a second malware detection model, wherein the second malware detection model is trained by federated learning using the parameters of the trained first malware detection model and additional parameters provided by one or more additional remote devices.

2. The method of claim 1, wherein the malware properties database comprises file characterization information for a plurality of known malicious files.

3. The method of claim 2, wherein the remote device labels a file as malicious if a match is identified between the file characterization information of the file and the file characterization information of one of the plurality of known malicious files.

4. The method of claim 3, wherein the remote device is configured to predict a maliciousness of at least one file of the one or more local files using the first malware detection model if a match is not identified, wherein the at least one file is labeled as either malicious or clean based on the prediction.

5. The method of claim 1, wherein the file characterization information for the one or more local files does not include sensitive information contained in any of the one or more local files.

6. The method of claim 1, wherein the second malware detection model is trained using one or more federated learning techniques including at least one of federated stochastic gradient descent, federated averaging, or dynamic regularization.

7. The method of claim 1, wherein the parameters of the trained first malware detection model comprise model weights.

8. The method of claim 1, wherein the first malware detection model is a supervised learning model.

9. The method of claim 1, further comprising:
predicting a maliciousness of at least one additional local file using the second malware detection model.

10. The method of claim 1, further comprising:
transmitting, to the remote device and concurrently with transmitting the parameters of the trained first malware detection model, metadata associated with the first malware detection model, wherein the metadata indicates a least a version number of the first malware detection model.

11. A malware detection system comprising:
one or more processors; and
memory having instructions stored thereon that, when executed by the one or more processors, cause the one or more processors to perform operations comprising:
transmitting, to a remote device, file characterization information for one or more local files, wherein the remote device generates a labeled training data set by: i) comparing the file characterization information of each of the one or more local files to a malware properties database, and ii) labeling each of the one or more files as either malicious or clean based on the comparison;
receiving, from the remote device, a first malware detection model and the labeled training data set;
training the first malware detection model using the labeled training data set;
transmitting parameters of the trained first malware detection model to the remote device; and
receiving, from the remote device, a second malware detection model, wherein the second malware detection model is trained by federated learning using the parameters of the trained first malware detection model and additional parameters provided by one or more additional remote devices.

12. The system of claim 11, wherein the malware properties database comprises file characterization information for a plurality of known malicious files.

13. The system of claim 12, wherein the remote device labels a file as malicious if a match is identified between the file characterization information of the file and the file characterization information of one of the plurality of known malicious files.

14. The system of claim 13, wherein the remote device is configured to predict a maliciousness of at least one file of the one or more local files using the first malware detection model if a match is not identified, wherein the at least one file is labeled as either malicious or clean based on the prediction.

15. The system of claim 11, wherein the file characterization information for the one or more local files does not include sensitive information contained in any of the one or more local files.

16. The system of claim 11, wherein the second malware detection model is trained using one or more federated learning techniques including at least one of federated stochastic gradient descent, federated averaging, or dynamic regularization.

17. The system of claim 11, wherein the parameters of the trained first malware detection model comprise model weights.

18. The system of claim 11, wherein the first malware detection model is a supervised learning model.

19. The system of claim 11, the operations further comprising:
predicting a maliciousness of at least one additional local file using the second malware detection model.

20. The system of claim 11, the operations further comprising:
transmitting, to the remote device and concurrently with transmitting the parameters of the trained first malware detection model, metadata associated with the first malware detection model, wherein the metadata indicates a least a version number of the first malware detection model.

\* \* \* \* \*